(12) United States Patent
Zankl et al.

(10) Patent No.: US 10,746,148 B2
(45) Date of Patent: Aug. 18, 2020

(54) CHECK VALVE, HIGH-PRESSURE COMPONENT, AND HIGH-PRESSURE FUEL PUMP

(71) Applicant: CPT Group GmbH, Hannover (DE)

(72) Inventors: Markus Zankl, Waldmünchen (DE); Helmut Kamm, Roding (DE); Josef Tremmel-Burian, Cham (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 0 days.

(21) Appl. No.: 16/333,345

(22) PCT Filed: Sep. 18, 2017

(86) PCT No.: PCT/EP2017/073412
§ 371 (c)(1),
(2) Date: Mar. 14, 2019

(87) PCT Pub. No.: WO2018/050881
PCT Pub. Date: Mar. 22, 2018

(65) Prior Publication Data
US 2019/0211789 A1  Jul. 11, 2019

(30) Foreign Application Priority Data

Sep. 19, 2016 (DE) .......................... 10 2016 217 923

(51) Int. Cl.
*F02M 61/04* (2006.01)
*F02M 59/46* (2006.01)
(Continued)

(52) U.S. Cl.
CPC .......... *F02M 59/462* (2013.01); *F02M 59/44* (2013.01); *F16J 15/3452* (2013.01);
(Continued)

(58) Field of Classification Search
CPC .... F02M 59/462; F02M 59/44; F02M 63/007; F02M 63/0054; F02M 63/0077;
(Continued)

(56) References Cited

U.S. PATENT DOCUMENTS 2,699,179 A * 1/1955 Hansen ................ G05D 7/0133
137/539
2,903,014 A * 9/1959 Sheppard ............. F02M 59/462
137/539

(Continued)

FOREIGN PATENT DOCUMENTS

AT         503 703 A1   12/2007   ............. F16K 17/04
DE       1 233 214 B     1/1957   ................ F16F 7/08
(Continued)

OTHER PUBLICATIONS

German Office Action, Application No. 10 2016 217 923.3, 4 pages, dated Jul. 27, 2017.

(Continued)

*Primary Examiner* — Hai H Huynh
(74) *Attorney, Agent, or Firm* — Slayden Grubert Beard PLLC

(57) ABSTRACT

Various embodiments include a check valve for a high-pressure component in a fuel injection system comprising: a valve housing with a valve hole having an inner diameter; a valve seat and a sealing element arranged in the valve hole; and a coil spring pushing the sealing element toward the valve seat along a longitudinal axis of the valve hole. The coil spring includes a plurality of coil turns each having an outer diameter. In a non-assembled state of the check valve, the outer diameter of at least one of the coil turns is greater than the inner diameter of at least a portion of the valve hole, so that in an assembled state of the check valve, the coil spring is secured in a force-fitting manner in the valve hole.

9 Claims, 5 Drawing Sheets

(51) Int. Cl.

| | | |
|---|---|---|
| *F16J 15/34* | (2006.01) | |
| *F16K 15/02* | (2006.01) | |
| *F16K 15/04* | (2006.01) | |
| *F02M 59/44* | (2006.01) | |
| *F02M 61/16* | (2006.01) | |
| *F02M 61/20* | (2006.01) | |
| *F02M 63/00* | (2006.01) | |
| *F16F 1/04* | (2006.01) | |
| *F16F 1/12* | (2006.01) | |

(52) U.S. Cl.
CPC .......... *F16K 15/026* (2013.01); *F16K 15/044* (2013.01); *F02M 61/168* (2013.01); *F02M 61/20* (2013.01); *F02M 63/007* (2013.01); *F02M 2200/50* (2013.01); *F02M 2200/8061* (2013.01); *F16F 1/047* (2013.01); *F16F 1/123* (2013.01)

(58) Field of Classification Search
CPC ................ F02M 61/20; F02M 61/168; F02M 2200/8061; F02M 2200/50; F16K 15/044; F16K 15/026; F16J 15/3452; F16F 1/123; F16F 1/047
USPC .................................. 123/456, 457, 510, 511
See application file for complete search history.

(56) References Cited

U.S. PATENT DOCUMENTS

| | | | | |
|---|---|---|---|---|
| 5,251,664 A | * | 10/1993 | Arvidsson | F16K 15/026 137/469 |
| 6,116,273 A | * | 9/2000 | Tarr | F02M 57/02 123/446 |
| 6,595,238 B2 | * | 7/2003 | De Matthaeis | F02M 59/462 123/506 |
| 7,871,251 B2 | * | 1/2011 | Marino | F02M 59/462 137/539 |
| 2005/0178434 A1 | * | 8/2005 | Yang | E03B 7/10 137/218 |
| 2005/0205065 A1 | * | 9/2005 | Rembold | F02M 63/0036 123/446 |
| 2008/0047531 A1 | * | 2/2008 | Breuer | F02M 37/0023 123/510 |
| 2013/0340861 A1 | * | 12/2013 | Rajagopalan | F16K 15/026 137/511 |
| 2016/0169174 A1 | | 6/2016 | Teike et al. | 137/539 |

FOREIGN PATENT DOCUMENTS

| | | | | |
|---|---|---|---|---|
| DE | 199 27 197 A1 | 12/2000 | | F04B 53/10 |
| DE | 10 2008 023 296 A1 | 11/2009 | | F16K 15/12 |
| DE | 10 2010 063 375 A1 | 1/2012 | | F02M 59/46 |
| DE | 10 2014 206 968 A1 | 10/2015 | | F02M 59/10 |
| EP | 0 683 332 A1 | 11/1995 | | F01N 13/18 |
| EP | 2 184 490 A1 | 5/2010 | | F04B 1/04 |
| JP | 4984727 A | 8/1974 | | H04N 7/025 |
| JP | 2000227062 A | 8/2000 | | F02M 59/24 |
| WO | 2015/014536 A1 | 2/2015 | | F02M 59/46 |
| WO | 2018/050881 A1 | 3/2018 | | F02M 59/44 |

OTHER PUBLICATIONS

International Search Report and Written Opinion, Application No. PCT/EP2017/073412, 18 pages, dated Nov. 29, 2017.

Korean Office Action, Application No. 20197007984, 11 pages, dated Feb. 6, 2020.

* cited by examiner

Stand der Technik

CHECK VALVE, HIGH-PRESSURE COMPONENT, AND HIGH-PRESSURE FUEL PUMP

CROSS-REFERENCE TO RELATED APPLICATIONS

This application is a U.S. National Stage Application of International Application No. PCT/EP2017/073412 filed Sep. 18, 2017, which designates the United States of America, and claims priority to DE Application No. 10 2016 217 923.3 filed Sep. 19, 2016, the contents of which are hereby incorporated by reference in their entirety.

TECHNICAL FIELD

The present disclosure relates to fuel injection systems. Various embodiments may include check valves for a high-pressure component in a fuel injection system, high-pressure components with such a check valve, and/or high-pressure fuel pumps comprising such a high-pressure component with a check valve.

BACKGROUND

High-pressure fuel pumps in fuel injection systems are used for applying a high pressure to a fuel, wherein for example in the case of gasoline internal combustion engines the pressure lies in a range from 150 bar to 500 bar and in the case of diesel internal combustion engines the pressure lies in a range from 1500 bar to 3000 bar. The higher the pressure that can be generated in the respective fuel, the lower the emissions that are produced during the combustion of the fuel in a combustion chamber, which, in particular against the background that the reduction of emissions is becoming increasingly desirable, is advantageous.

The fuel is in this case compressed in the high-pressure fuel pump in a pressure chamber provided for this and is then usually fed by way of a high-pressure connection to a pressure accumulator arranged hydraulically downstream of the pressure chamber, known as the common rail, from where the fuel can then be injected by way of injectors into combustion spaces of the combustion chambers. The fuel injection system is a hydraulic system, in which passive valves such as for example check valves are used at various points in order only to allow the pressurized fuel to be passed on as from a predefined pressure level. Such check valves may comprise outlet valves in the high-pressure connection of the high-pressure fuel pump, but also as pressure limiting valves, which in the event of overpressure divert excess fuel away from the high-pressure region of the fuel injection system in order to relieve it.

Check valves for such applications that are known from the prior art, for example from DE 10 2014 206 968 A1, are normally made up of three main components, specifically a sealing element, a coil spring, which preloads the sealing element onto an associated valve seat, and a valve securing element, on which the helical spring is supported. This spring securing element is normally pressed into a corresponding hole, through which the fuel under high pressure is intended to be passed on.

It is however becoming increasingly more difficult to ensure a reliable interference fit between this spring securing element and a high-pressure component in which this hole has been made if the pressures reside in a range of greater than 2000 bar. This is so because, as a consequence of the internal pressure, the high-pressure component expands in the region of the hole, wherein this expansion removes the tensioning from the interference-fit assembly and the spring securing element begins to move around in the hole in which it is held. Then the check valve no longer functions as a valve. In addition, the spring securing element as a component itself may require an additional installation space within the high-pressure component in which it is accommodated.

SUMMARY

The teachings of the present disclosure describe check valves that may be fastened in a high-pressure component more securely than previously known. For example, some embodiments include a check valve (48) for a high-pressure component (44) in a fuel injection system (10), having: a valve housing (60) with a valve hole (58) formed therein, which has an inner diameter (DI) and in which a valve seat (64) and a sealing element (52) interacting with the valve seat (64) are arranged, and a coil spring (54), which keeps the sealing element (52) on the valve seat (64) by a spring force (FF) acting along a longitudinal axis (AL) of the valve hole (58). The coil spring (54) has a plurality of coil turns (62) each with an outer diameter (DA). In a non-assembled state of the check valve (48) the outer diameter (DA) of at least one of the coil turns (62) is greater than the inner diameter (DI) of at least a sub-region of the valve hole (58), so that in an assembled state of the check valve (48) the coil spring (54) is secured in a force-fitting manner in the valve hole (58).

In some embodiments, the coil spring (54) has a spring preloading region (68), which is deformable along the longitudinal axis (AL) under a predefined amount of force, and a force-fitting region (72), which is substantially not deformable along the longitudinal axis (AL) under the predefined amount of force, wherein the coil spring (54) contacts the sealing element (52) with the spring preloading region (68), while the force-fitting region (72) is arranged opposite from the sealing element (52) along the longitudinal axis (AL).

In some embodiments, the spring preloading region (68) is formed conically and is supported with a cone tip region (70) on the sealing element (52), wherein the force-fitting region (72) comprises a plurality of coil turns (62), which have substantially the same outer diameter (DA), wherein in particular an outermost coil turn (62) of the force-fitting region (72) is formed as drawn-in inwardly in the direction of an axis of symmetry (AS) of the coil spring (53).

In some embodiments, the valve hole (58) has a first valve hole region (76) with a first inner diameter (DI1) and a second valve hole region (78) with a second inner diameter (DI2), wherein the sealing element (52) and the coil spring (54) are arranged in the first valve hole region (76), wherein the first inner diameter (DI1) is greater than the second inner diameter (DI2).

In some embodiments, a bearing collar (84) on which the coil spring (54) is supported with its force-fitting region (72) is formed at a transition (82) from the first valve hole region (76) to the second valve hole region (78).

In some embodiments, the first inner diameter (DI1) is substantially constant at least along a longitudinal extent (L) of the coil spring (54), wherein the second inner diameter (DI2) widens conically along the longitudinal axis (AL) away from the first valve hole region (76).

In some embodiments, a transition (82) from the first valve hole region (76) to the second valve hole region (78) is formed as convexly rounded.

As another example, some embodiments include a high-pressure component (44), in particular a high-pressure connection (46) for a high-pressure fuel pump (18), having a check valve (48) as described above, characterized in that the valve housing (60) is formed by the high-pressure component (44).

As another example, some embodiments include a high-pressure fuel pump (18) for a fuel injection system (10) of an internal combustion engine, having a pressure chamber (26) for applying high pressure to fuel (12), and a high-pressure component (44), which is arranged downstream of the pressure chamber (26) and has a check valve (48) as described above, which is formed in particular as an outlet valve (28) for letting out fuel (12) under high pressure from the pressure chamber (26).

BRIEF DESCRIPTION OF THE DRAWINGS

Various embodiments of the teachings herein are explained in more detail below on the basis of the accompanying drawings, in which.

DETAILED DESCRIPTION

Figure 1:
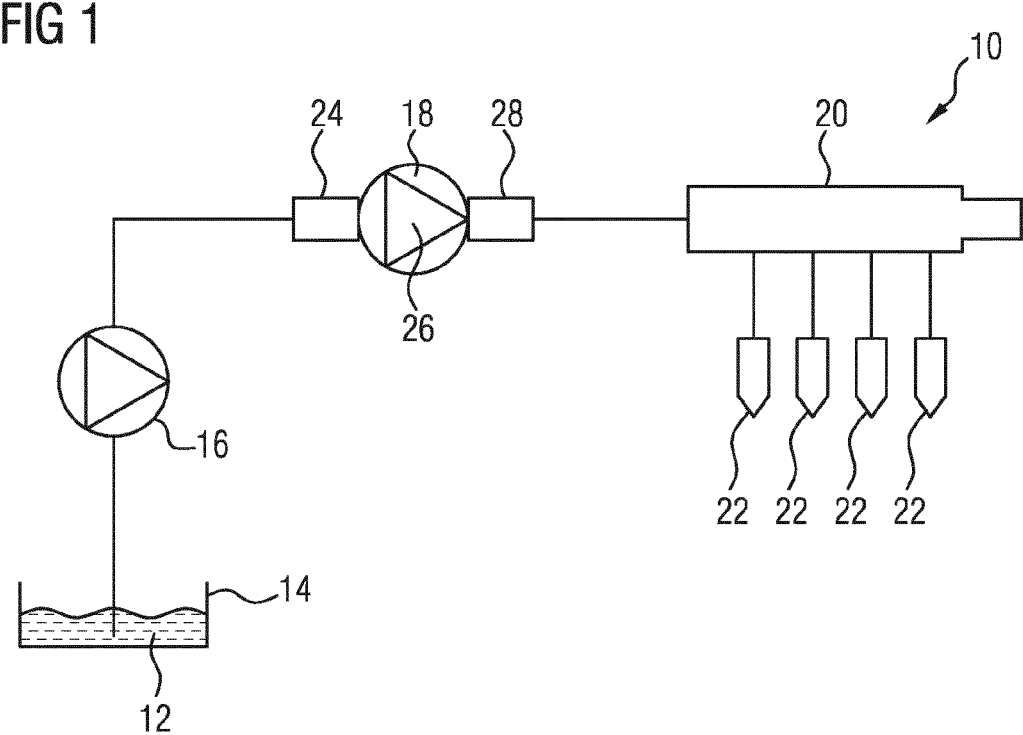
FIG. 1 shows a schematic representation of a fuel injection system for an internal combustion engine that has a high-pressure fuel pump with at least one check valve.

In some embodiments, a check valve for a high-pressure component in a fuel injection system has a valve housing with a valve hole formed therein, which has an inner diameter and in which a valve seat and a sealing element interacting with the valve seat are arranged, and a coil spring, which keeps the sealing element on the valve seat by a spring force acting along a longitudinal axis of the valve hole. The coil spring has a plurality of coil turns each with an outer diameter. In a non-assembled state of the check valve, the outer diameter of at least one of these coil turns is greater than the inner diameter of at least a sub-region of the valve hole, so that in an assembled state of the check valve the coil spring is secured in a force-fitting manner in the valve hole.

In some embodiments, it is possible by contrast with the prior art to dispense with the valve securing element, because the coil spring itself establishes the force-fitting connection to the high-pressure component, and consequently there is no need for the spring securing element. As a result, negative influences such as pressure infiltration of the interference fit of the spring securing element and the high-pressure component are avoided. What is more, the elimination of the interference fit has the effect of increasing the high-pressure resistance of the high-pressure component. In addition, installation space which in the prior art is provided for the spring securing element can be saved.

In some embodiments, the coil spring has a spring preloading region, which is deformable along the longitudinal axis under a predefined amount of force, and a force-fitting region, which is substantially not deformable along the longitudinal axis under the predefined amount of force. In this case, the coil spring contacts the sealing element with the spring preloading region, while the force-fitting region is arranged opposite from the sealing element along the longitudinal axis.

The coil spring is accordingly formed in such a way that one region thereof is optimized for providing the necessary spring force to keep the sealing element on the valve seat, and that a region separate therefrom is optimized for providing the securement to prevent displacement of the coil spring in the high-pressure component. With such an optimized coil spring, the problem of component deformation that occurs with a spring securing element due to the infiltration of the interference fit can be advantageously avoided, because it is simply possible to dispense with the spring securing element since the coil spring itself undertakes the securement in the high-pressure component. This coil spring is therefore geometrically adapted in such a way that on the one hand it undertakes the spring preloading of the sealing element in the spring preloading region, and on the other hand it is designed in the force-fitting region in such a way that the securement to prevent displacement in the high-pressure component is ensured.

In some embodiments, in the spring preloading region the individual coil turns are formed as spaced apart from one another, so that the coil spring in this region can be deformed along the longitudinal axis when a predefined amount of force is applied to the coil spring. This may take place for example by pressure being applied by the sealing element. It is also advantageous if in the force-fitting region the coil turns lie directly against one another, without a spacing in between, so that no deformation of the force-fitting region is possible by the amount of force that can deform the spring preloading region. In some embodiments, the spring preloading region is in this case formed conically and is supported with a cone tip region on the sealing element.

In some embodiments, the cone tip region with which the coil spring is supported on the sealing element has a conical widening, in order to be better able to engage around the sealing element and consequently guide it. In some embodiments, the force-fitting region comprises a plurality of coil turns, which have substantially the same outer diameter. By providing a number of coil turns that have the same outer diameter, it is possible to be able to establish a secure force fit with the valve hole.

In some embodiments, an outermost coil turn of the force-fitting region is formed as drawn-in inwardly in the direction of an axis of symmetry of the coil spring. As a result, a point of engagement for a tool can be provided on the coil spring by an inwardly protruding end, in order to allow the coil spring to be handled and reliably introduced into the valve hole. At such an end, the coil spring can be turned counter to its winding direction by means of a tool after being placed into the valve hole during a joining operation. The tool transfers a torque by engaging in this outermost drawn-in coil turn of the coil spring. As a result, the outer diameter of the force-fitting region is reduced, and the coil spring can be pushed into the valve hole in a defined manner. If the torque from the tool that is used is then removed again, the coil spring opens out again and lies firmly against the high-pressure component in the valve hole, whereby the coil spring is then fixed by means of a force fit.

Altogether, the coil spring is therefore deformable in the radial direction in particular in the force-fitting region, in order to be able in this way to reversibly and temporarily change the outer diameter.

In some embodiments, the valve hole has a first valve hole region with a first inner diameter and a second valve hole region with a second inner diameter, wherein the sealing element and the coil spring are arranged in the first valve hole region. The first inner diameter in this case may be greater than the second inner diameter. In some embodiments, a bearing collar on which the coil spring is supported with its force-fitting region is in this case formed at a transition from the first valve hole region to the second valve hole region. In some embodiments, the valve hole is therefore provided with a geometry to secure the coil spring additionally against displacement in the axial direction by means of a form fit.

In some embodiments, the first inner diameter is substantially constant at least along a longitudinal extent of the coil spring. The second inner diameter widens conically along the longitudinal axis away from the first valve hole region. In some embodiments, a transition from the first valve hole region to the second valve hole region is formed as convexly rounded. The conical widening can provide an insertion cone or an insertion radius, by way of which the coil spring can be inserted into the valve bore. During insertion, it can then easily slide over the convex rounding between the two valve hole regions, to then lie firmly against the bearing collar in the first inner diameter of the valve hole. The coil spring is pushed into the valve hole by way of the insertion cone provided by the conical widening or an insertion radius and then, after passing over the bearing collar, opens out.

In some embodiments, a high-pressure component, which is formed for example as a high-pressure connection for a high-pressure fuel pump, has a check valve described above, wherein the high-pressure component itself forms the valve housing of the check valve.

In some embodiments, a high-pressure fuel pump for a fuel injection system of an internal combustion engine has a pressure chamber for applying high pressure to fuel and a high-pressure component which is arranged downstream of the pressure chamber and has the check valve as described above. The check valve may in this case be arranged for example in a high-pressure connection and be formed as an outlet valve for letting out fuel under high pressure from the pressure chamber. However, it is also possible that the check valve is formed as a pressure limiting valve, in order to divert high pressure in a pressure accumulator region arranged downstream of the pressure chamber.

Altogether, the check valve described above allows the number of components to be reduced while maintaining the same function of the check valve. In addition, the previously customary interference-fit assembly is no longer needed, whereby a reduction of the stresses in the high-pressure component is made possible. Furthermore, the pressure drop across the check valve due to the previously provided and now absent spring securing element is also reduced.

FIG. 1 shows a schematic representation of a fuel injection system 10 of an internal combustion engine, which delivers a fuel 12 from a tank 14 by way of a primary pump 16, a high-pressure fuel pump 18, and a high-pressure fuel accumulator 20 to injectors 22, which then inject the fuel 12 into combustion spaces of the internal combustion engine. The fuel 12 is introduced into a pressure chamber 26 by way of an inlet valve 24 on the high-pressure fuel pump 18 and let out from this pressure chamber 26 by way of an outlet valve 28 and passed on to the high-pressure fuel accumulator 20.

Figure 2:
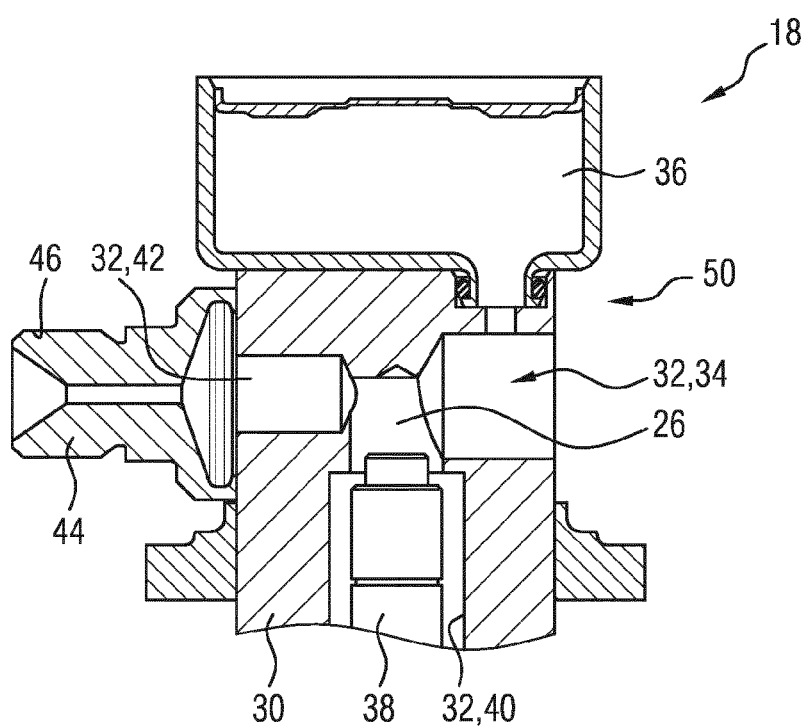
FIG. 2 shows a schematic longitudinal sectional representation through the high-pressure fuel pump from FIG. 1 with a high-pressure connection as a high-pressure component.

FIG. 2 shows a longitudinal sectional representation of the high-pressure fuel pump 18 from FIG. 1. Arranged in a housing 30 of the high-pressure fuel pump 18 are a number of bores 32, which assume various functions. By way of an inlet bore 34, the fuel 12 is fed from a damper 36 to the pressure chamber 26, in which a plunger 38 moves in a translatory manner in a plunger bore 40 and thus periodically compresses the fuel 12 in the pressure chamber 26. The compressed fuel 12 is then passed on by way of an outlet bore 42 into a high-pressure component 44, known as the high-pressure connection 46, from where the fuel 12 is then passed on further to the high-pressure fuel accumulator 20.

In order to ensure that only fuel 12 under the desired pressure reaches the high-pressure fuel accumulator 20, normally arranged in the high-pressure component 44 is the outlet valve 28, which is usually formed as a check valve 48. Often also arranged in this region is a second check valve 48, in order to be able to divert an overpressure in the high-pressure fuel accumulator 20 back again for example into the pressure chamber 26 or into a low-pressure region 50 of the fuel injection system 10.

Figure 3:
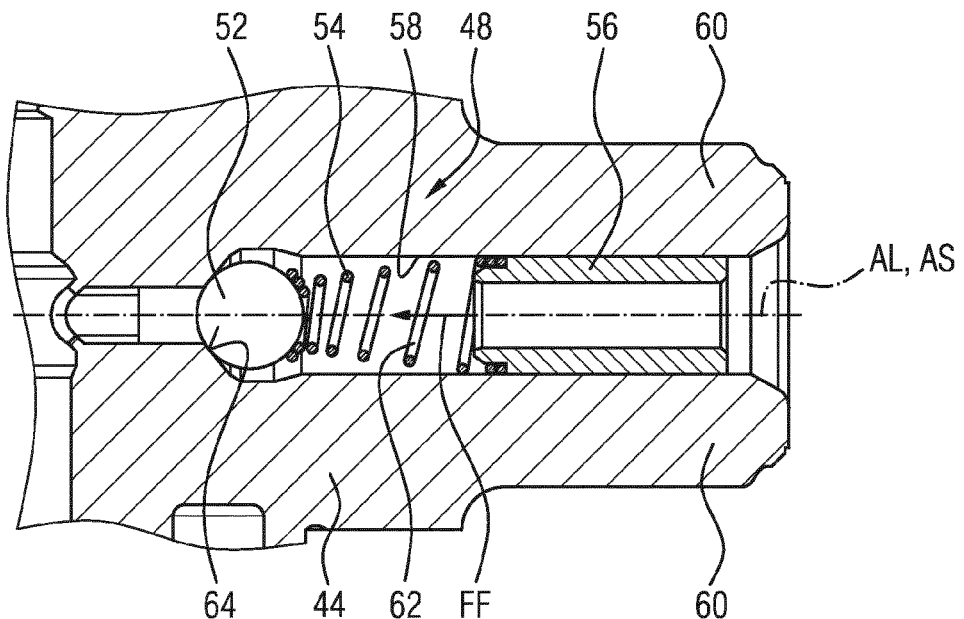
FIG. 3 shows a sectional view of a high-pressure component with a check valve from the prior art.

FIG. 3 shows a sectional view of a high-pressure component 44 of such a high-pressure fuel pump 18 from FIG. 2, wherein such a check valve 48 from the prior art is arranged in the high-pressure component 44. The check valve 48 has a sealing element 52, a coil spring 54 and a spring securing element 56. The spring securing element 56 is fixed with an interference fit in the outlet bore 42, which at the same time forms a valve hole 58. It serves the purpose of allowing the coil spring 54 to be supported on it, and of preventing the coil spring 54 from moving within the valve hole 58.

In the case of modern high-pressure fuel pumps 18, in the meantime very high pressures are generated in the fuel 12, and these also have an effect on the spring securing element 56. This is so because these high pressures have the effect that the valve hole 58 widens, and consequently the spring securing element 56 can no longer be kept securely in the valve hole 58 by the interference-fit assembly. Therefore, there now follows a proposal of a formation of a check valve 48 in which it is possible to dispense with this spring securing element 56 with the known disadvantages at very high pressures in the fuel 12.

Figure 4:
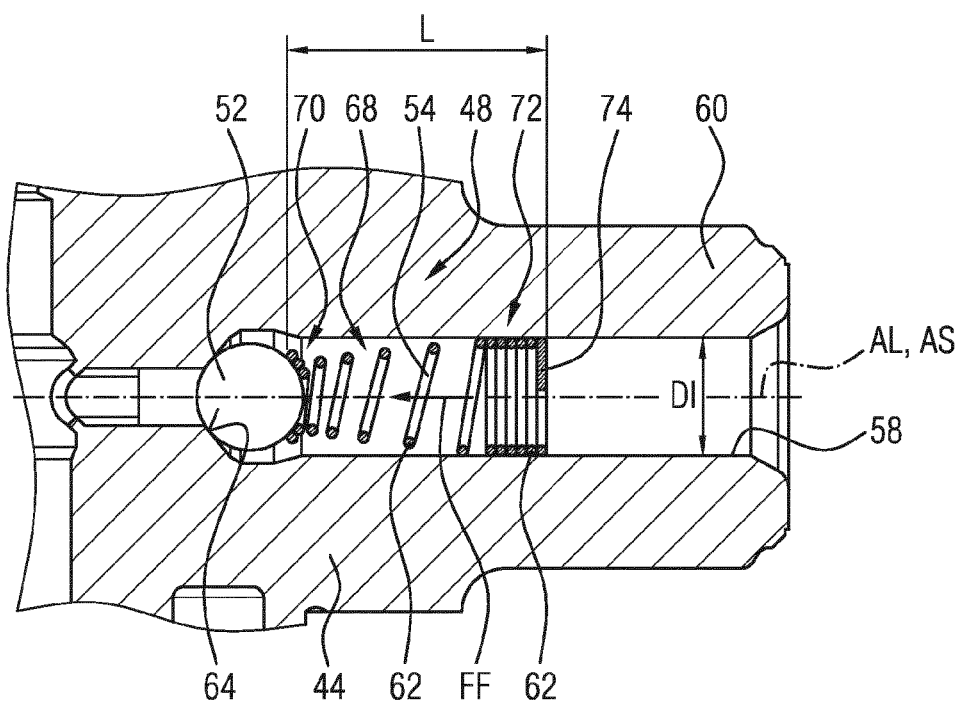
FIG. 4 shows a sectional view of a first embodiment of a high-pressure component with a check valve incorporating the teachings herein.

FIG. 4 shows in this respect a sectional representation of an example embodiment of such a check valve 48. Since the outlet bore 42 at the same time forms the valve hole 58 for the check valve 48, the high-pressure component 44, in which the check valve 48 is arranged, also forms at the same time a valve housing 60 for the check valve 48. The first embodiment in FIG. 4 completely dispenses with the spring securing element 56 and other bearing surfaces on which the coil spring 54 could be supported, since the geometry of the valve hole 58 and the geometry of a sub-region of the coil spring 54 are made to match one another in such a way that the coil spring 54 supports itself on the valve hole 58. For this purpose, the coil spring 54 has a plurality of coil turns 62, which each have an outer diameter DA. When the coil spring 54 has not yet been introduced into the valve hole 58, this outer diameter DA of at least one of these coil turns 62 is greater than an inner diameter DI of the valve hole 58, to be precise at least in a sub-region of the valve hole 58. If the coil spring 54 is therefore compressed slightly in the radial direction in order to be inserted into the valve hole 58, and then let go, the coil spring 54 expands in the radial direction as soon as it is arranged in the valve hole 85, and presses itself against the valve hole 58 with its coil turns 62 that have the great outer diameter DA, and consequently anchors itself in the valve hole 58.

If forces due to the pressurized fuel 12 then act along a longitudinal axis AL of the valve hole 58 from the sealing element 52, which the coil spring 54 is keeping on a valve seat 64 formed in the valve hole 58, it is then no longer the case that widening of the valve hole 58 undoes the interference-fit assembly of a previously known spring securing element 56. This is so because the coil turns 62 also expand, and consequently keep themselves firmly against the valve hole 58' specifically due to the high force effect. The coil spring 54 can therefore keep the sealing element 52 on the valve seat 64 even under high pressures and with undiminished spring force FF.

Figure 5:
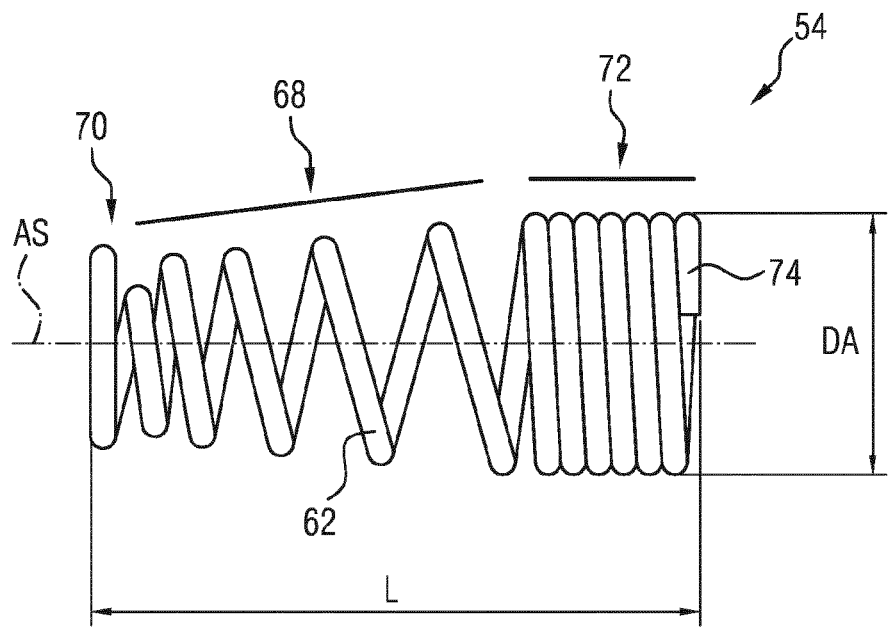
FIG. 5 shows a sectional view of a coil spring of the check valve from FIG. 4.

FIG. 5 shows a sectional view through the coil spring 54 from FIG. 4. It can be seen that the coil spring 54 has two regions, which have different functions. A spring preloading region 68, which in the fitted state is supported on the sealing element 52, is provided for applying the spring force FF to the sealing element 52. For this purpose, the individual coil turns 62 are formed as slightly spaced apart from one another, in order to allow a deflection distance in the direction of the longitudinal axis AL. In this region, the coil spring 54 is deformable along the longitudinal axis AL as soon as a sufficient predefined amount of force is applied to the coil spring 54, for example when pressurized fuel 12 presses on the sealing element 52 from the other side.

As can be seen in FIG. 5, this spring preloading region 68 is advantageously conically formed and during operation is supported with a cone tip region 70 on the sealing element 52. The coil spring 54 also comprises a force-fitting region 72, directly adjoining the spring preloading region 68 and consequently lying opposite from the sealing element 52 during operation. In this force-fitting region 72, the coil turns 62 lie directly against one another, so that here the coil spring 54 is not deformable along the longitudinal axis AL when the predefined amount of force acts for example from the sealing element 52 on the coil spring 54. The force-fitting region 72 has a number of coil turns 62, all of which have the same outer diameter DA, which in the non-assembled state is greater than the inner diameter DI of the valve hole 58. Therefore, the coil spring 54 goes over from its conical form in the spring loading region 68 into a cylindrical form in the force-fitting region 72.

Figure 6:
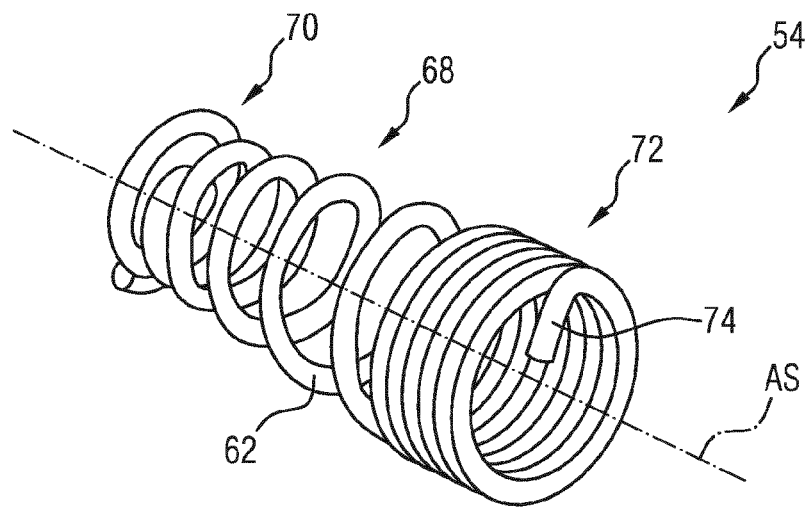
FIG. 6 shows a perspective representation of the coil spring from FIG. 5.

FIG. 6 shows a perspective view of the coil spring 54 from FIG. 5. Here it can be seen that the outermost coil turn 62 is formed as drawn-in inwardly in the direction of an axis of symmetry AS of the coil spring 54, about which all of the coil turns 62 of the coil spring 54 are symmetrically arranged. This creates an end 74, at which the coil spring 54 can be engaged by a tool. By means of such a tool, for example by turning, the outer diameter DA of the coil spring 54 in the force-fitting region 72 can be changed, so that the coil spring 54 can be inserted into the valve hole 58. If the tool is then removed again, the coil spring 54 expands again in the force-fitting region 72, and a force fit is established between the coil spring 54 and the valve hole 58. By way of the end 74, therefore, a joining torque can be applied to the coil spring 54 by means of an assembly tool.

Figure 7:
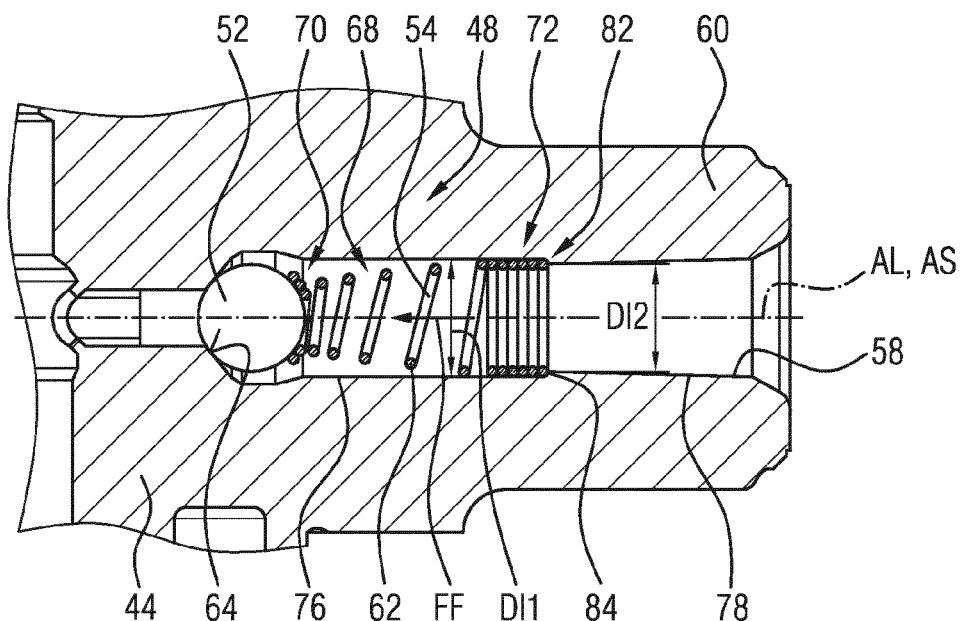
FIG. 7 shows a sectional view of a second embodiment of a high-pressure component with a check valve incorporating the teachings herein.

FIG. 7 shows a sectional representation of the high-pressure component 44 with the check valve 48 in another example embodiment. Here it can be seen that the valve hole 58 has a first valve hole region 76, in which the sealing element 52 and the coil spring 54 are arranged. The valve hole 58 also has a second valve hole region 78, which adjoins the first valve hole region 67 downstream along the longitudinal axis AL as seen from the sealing element 52. A first inner diameter DI1 of the first valve hole region 76 is greater than a second inner diameter DI2 of the second valve hole region 78. As a result, a bearing collar 84, on which the coil spring 54 is supported with its force-fitting region 72 in the assembled state, is formed at a transition 82 between the two valve hole regions 76, 78.

Figure 8:
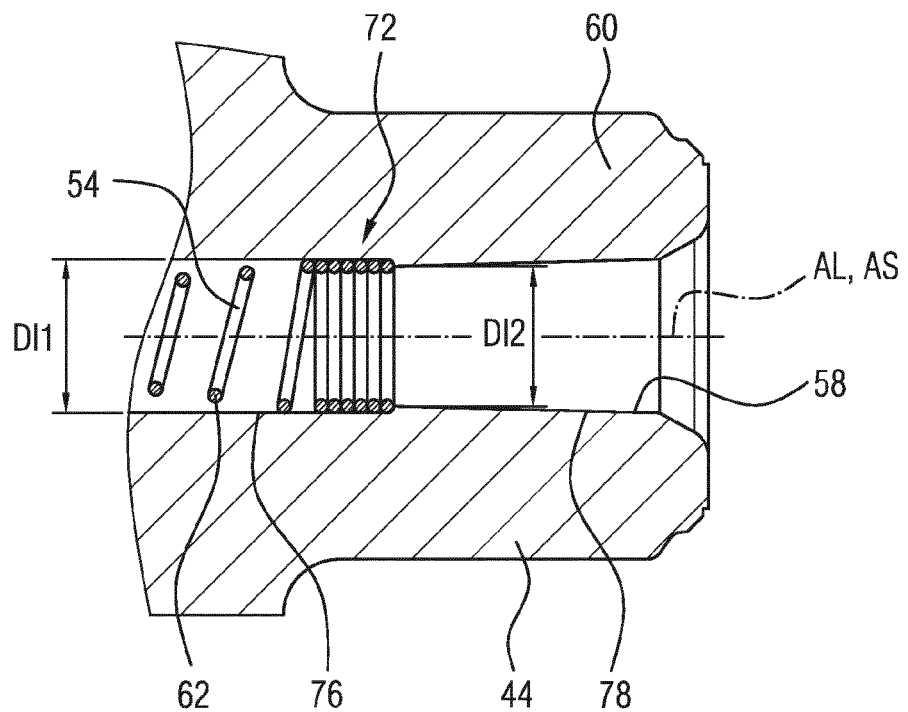
FIG. 8 shows a view of a detail of the high-pressure component from FIG. 7.

FIG. 8 shows the high-pressure component 44 from FIG. 7 in an enlarged representation in the region of the force-fitting region 72 of the coil spring 54. It can be seen that the first inner diameter DI' of the first valve hole region 76 is substantially constant, since a secure force fit can in this way be achieved between the coil spring 54 and the valve hole 58. Therefore, the inner diameter DI' is substantially constant, at least along the longitudinal extent, that is to say the length L, of the coil spring 54. In order to insert the coil spring 54 more easily into the valve hole 58, the second inner diameter DI2 widens conically along the longitudinal axis AL away from the first valve hole region 76. An initially flat insertion cone, which further widens conically in the downstream direction, is shown in FIG. 8.

Figure 9:
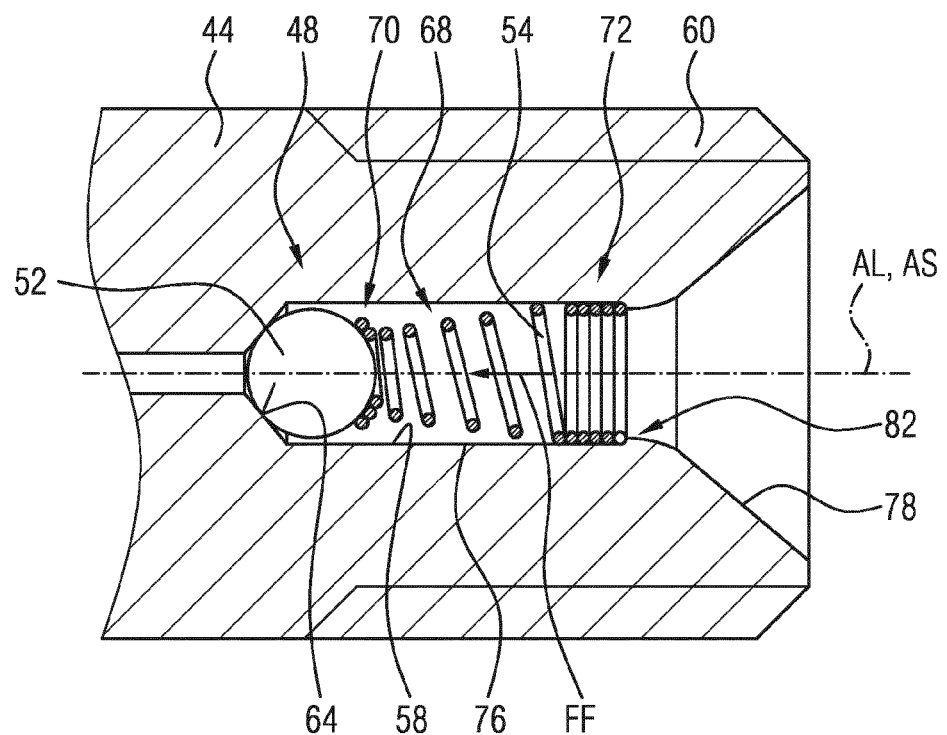
FIG. 9 shows a sectional view of a third embodiment of a high-pressure component with a check valve incorporating the teachings herein.

FIG. 9 shows a sectional view through a third embodiment of the high-pressure component 44, in which the second inner diameter DI2 conically widens greatly after the first inner diameter DI1, and consequently forms a steep insertion cone. In addition, in FIG. 9 there is formed at the transition 82 an insertion radius, in which the transition 82 is formed as convexly rounded. Also as a result of this, facilitated insertion of the coil spring 54 into the valve hole 58 can be achieved.

What is claimed is:

1. A check valve for a high-pressure component in a fuel injection system, the check valve comprising:
   a valve housing with a valve hole formed therein, the valve hole having an inner diameter;
   a valve seat and a sealing element interacting with the valve seat arranged in the valve hole; and
   a coil spring pushing the sealing element toward the valve seat with a spring force acting along a longitudinal axis of the valve hole;
   wherein the coil spring includes a plurality of coil turns each having an outer diameter;
   in a non-assembled state of the check valve, the outer diameter of at least one of the coil turns is greater than the inner diameter of at least a portion of the valve hole, so that in an assembled state of the check valve, the coil spring is secured in a force-fitting manner in the valve hole; and
   the at least one of the coil turns forms one axial end of the coil spring disposed opposite the sealing element.

2. The check valve as claimed in claim 1, wherein:
   the coil spring includes: a spring preloading region deformable along the longitudinal axis under a predefined amount of force, and a force-fitting region substantially not deformed along the longitudinal axis under the predefined amount of force; and
   the coil spring contacts the sealing element in the spring preloading region and the force-fitting region is arranged opposite from the sealing element along the longitudinal axis.

3. The check valve as claimed in claim 2, wherein:
the spring preloading region comprises a conic shape supported by a cone tip region on the sealing element;
the force-fitting region comprises a portion of the plurality of coil turns which have substantially the same outer diameter; and
an outermost coil turn of the force-fitting region is drawn-in inwardly in the direction of an axis of symmetry of the coil spring.

4. The check valve as claimed in claim 1, wherein:
the valve hole has a first region with a first inner diameter and a second region with a second inner diameter;
the sealing element and the coil spring are arranged in the first region; and
the first inner diameter is greater than the second inner diameter.

5. The check valve as claimed in claim 4, further comprising a bearing collar on which the coil spring is supported with its force-fitting region formed at a transition between the first region to the second region.

6. The check valve as claimed in claim 4, wherein:
the first inner diameter is substantially constant at least along a longitudinal extent of the coil spring; and
the second inner diameter widens conically along the longitudinal axis away from the first region.

7. The check valve as claimed in claim 4, wherein a transition from the first region to the second region is convexly rounded.

8. A high-pressure component for a high-pressure fuel pump, the component comprising:
a valve housing formed by the high-pressure component, the valve housing with a valve hole formed therein, the valve hole having an inner diameter;
a valve seat and a sealing element interacting with the valve seat arranged in the valve hole; and
a coil spring pushing the sealing element toward the valve seat with a spring force acting along a longitudinal axis of the valve hole;
wherein the coil spring includes a plurality of coil turns each having an outer diameter;
in a non-assembled state of the check valve, the outer diameter of at least one of the coil turns is greater than the inner diameter of at least a portion of the valve hole, so that in an assembled state of the check valve, the coil spring is secured in a force-fitting manner in the valve hole; and
the at least one of the coil turns forms one axial end of the coil spring disposed opposite the sealing element.

9. A high-pressure fuel pump for a fuel injection system of an internal combustion engine, the fuel pump comprising:
a pressure chamber for applying high pressure to fuel;
a high-pressure component arranged downstream of the pressure chamber; and
a check valve comprising an outlet valve for letting fuel out of the pressure chamber under high pressure;
the check valve comprising:
a valve housing formed by the high-pressure component, the valve housing with a valve hole formed therein, the valve hole having an inner diameter;
a valve seat and a sealing element interacting with the valve seat arranged in the valve hole; and
a coil spring pushing the sealing element toward the valve seat with a spring force acting along a longitudinal axis of the valve hole;
wherein the coil spring includes a plurality of coil turns each having an outer diameter;
in a non-assembled state of the check valve, the outer diameter of at least one of the coil turns is greater than the inner diameter of at least a portion of the valve hole, so that in an assembled state of the check valve, the coil spring is secured in a force-fitting manner in the valve hole; and
the at least one of the coil turns forms one axial end of the coil spring disposed opposite the sealing element.

* * * * *